Patented May 25, 1948

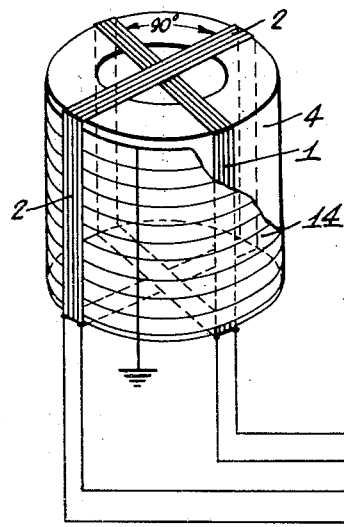
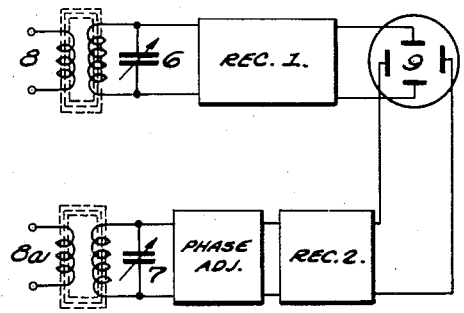
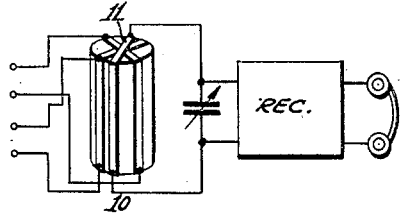
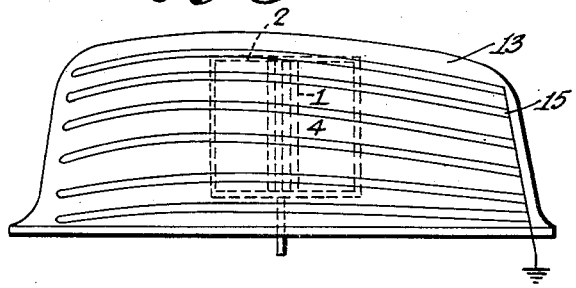

2,442,310

UNITED STATES PATENT OFFICE 2,442,310

DIRECTIONAL ANTENNA SYSTEM

Wladimir J. Polydoroff, Chicago, Ill.

Original application June 14, 1943, Serial No. 490,941, now Patent No. 2,399,382, dated April 30, 1946. Divided and this application July 16, 1945, Serial No. 605,378

7 Claims. (Cl. 250—33.67)

The invention relates to ferro-magnetic loop antenna systems such as were described in U. S. Patent No. 2,339,234.

A part of the above application is directed to employment of crossed loops and also shows an apparatus particularly applicable to the reception of electromagnetic waves in such instances when crossed loops can be employed to advantage.

The above patent as well as U. S. Patent No. 2,266,262 describes the advantages derived from the use of ferro-magnetic loop antenna, viz., increase of pickup by said antenna because of the presence of magnetic substances, improvement in directivity when such loops are used for radio compass work, relative ease of shielding of such antenna, and general reduction in size of the installation which makes it particularly adaptable for aircraft and marine navigational purposes.

This invention will be better understood if reference is made to the accompanying drawings in which Fig. 1 shows one construction of loop antennas on a common ferro-magnetic core;

Figs. 2 and 2a show arrangement of the circuits adaptable to a construction of Fig. 1;

Fig. 3 shows the assembly of the completed apparatus.

Referring now to Fig. 1 two loops, 1 and 2 are shown, each wound around the cylinder 4. The cylinder 4 is made of ferro-magnetic powdered material and composed of several toroidal rings assembled together to form a cylinder.

Both loops may be of aperiodic (low impedance type) and coupled individually to circuits 6 and 7 of Fig. 2 through conventional closed type transformers. In this case, the circuits are so connected that the output is compared by means of a suitable indicating meter or by a cathode ray oscilloscope 9.

In some cases it may be found convenient to compare two signals while they are brought in phase. Either of the receivers may be preceded or succeeded by an adjustable network to correct the phase of one of the signals before their outputs are compared or combined in the oscilloscope.

The loop construction of Fig. 1 may be advantageously applied to system where two loops are at right angles such as shown in Fig. 1 and the output is fed into two fixed windings and a movable search coil the rotation of which indicates the direction of a transmitter.

In this construction the loops are of low impedance type and are connected to a suitable receiver. The rotation of the search coil produces maximum and minimum signals in the receiver. Care should be taken that two windings are placed in non-inductive relation for which purpose one of the windings can be adjusted separately until no reaction exists between the windings. To avoid any capacitive coupling between the two windings each loop coil may be independently shielded.

Actual experience indicates that iron core greatly facilitate the positioning of two loops for the purpose of eliminating this reaction between two windings.

Fig. 1 also provides another application of the invention whereby a loop winding 1 is used for directional purposes and is wound around a cylinder core 4. Around the cylinder another loop 2 is wound so that its axis is perpendicular to the axis of the first loop.

In many instances of direction finding the loop is made rotatable to observe the zero reading after which in order to determine the sense of the direction the loop is turned 90 degrees from its zero setting, at which latter position a vertical antenna is applied (90 degrees out of phase) so as to produce well known cardioid pattern by which the "sense" of the direction is found. To avoid this unnecessary delay in taking of two bearings, the second loop is switched in lieu of the first loop, and its usual "figure 8" pattern is transformed into a cardioid by an addition at a vertical antenna to get a "sense" of the station. Thus by a simple selection of either loop and an addition of a vertical antenna the direction and sense are found at the same position of a rotatable assembly.

It is evident that for successful operation of such system both loops should be of the same inductance and while first loop should be shielded for a clean zero indication the second loop may be wound over the shield of the first loop, if the shield of the first loop is of the type known as Faraday screen and made of a wire cloth in which all the shielding wires run in one direction without completing loops. In certain instances such as on airplane installations it is possible to leave one of the loops unshielded and to enclose the assembly into a streamlined dome as shown on Fig. 3. Experience shows that a dome of plastic material with metallized strips, 15, forms an effective Faraday screen. From the standpoint of precipitation static such a screen is particularly effective against such static when the screening strips are laid horizontally, i. e., at the right angle to the loops of Fig. 1. When loop assembly is rotatable inside of such dome, no appreciable change of inductance is noticed, as the incomplete loops of screening are at right angles to loops 1 and 2. Fig. 3 shows the construction of such a dome in which shielding wires or ribs are placed horizontally, open circuited at the front of the dome and connected together and to the ground at the rear end of the dome. The construction of such a screen may be conveniently made by one of three methods: By masking the portions of the surface and spraying molten metal by means of a gun, known as a "metallizing process" which produces semi-conductive surfaces; by laying semi-conductive substances on the surface to be screened; and by electro-deposit of thin layer of metal. Each screening turn may be considered completed through the capacity and therefore acts as an absorber of the horizontal component of the electro-magnetic radiations which is usually present at the frequencies above 1 m. c. and is particularly pronounced at night, therefore being known as "night effect."

Thus the present invention describes the novel ways of utilizing loop coils around a common magnetic mass and new methods of applying such loops for directional purposes.

In the above described figures ferro-magnetic cores are shown in the shape of hollow cylinders but the invention is not limited to such shapes as it can be advantageously applied to any other shapes of cores, for instance, rectangular, spherical or any other symmetrical body of rotation.

Same type of loop with streamlined housing may be placed on the roof of an automobile since at that position of the loop the ignition noises picked up by the loop will be negligible and another loop at right angle, when switched on, will enable to pick up the signals which happen to be in the direction of the travel, or means for slight misalignment of the loop from its original position may be provided, so as to eliminate zero position.

The application is a division of my co-pending application Serial No. 490,941, filed on June 14, 1943, and entitled Directional antenna systems, now Patent 2,399,382, issued April 30, 1946, which was filed as continuation in part of U. S. Patent No. 2,339,234.

The invention is not to be limited to or by details of construction of the particular embodiment thereof illustrated by the drawings, as various other forms of the device will of course be apparent to those skilled in the art without departing from the spirit of the invention or the scope of the claims.

What I claim is:

1. A low impedance antenna system for the reception of electro-magnetic radiations comprising a coil antenna wound in a vertical plane around the sides of a cylindrical core, said core being made in toroidal sections and composed of compressed finely divided magnetic particles, screening means around said coil antenna and an elongated streamlined housing in the shape of a dome surrounding said antenna and said screening means.

2. A rotatable antenna system for directional reception of electro-magnetic radiations comprising a coil antenna wound in a vertical plane around a ferro-magnetic core in a form of a body of rotation, said core being composed of compressed finely divided magnetic particles, screening means around said coil antenna, said screening means being formed by a plurality of co-axial open loops in the plane at right angle to the plane of said coil antenna and an elongated streamlined housing surrounding said antenna and said screening means.

3. An antenna system for two-directional reception of electro-magnetic radiations comprising a pair of coil antennas at right angle to each other wound around sides of a cylindrical ferro-magnetic core, said core being made in sections of compressed finely divided magnetic particles, screening means around at least one of said coil antennas switching means between said coil antennas to select one or the other and an elongated streamlined housing surrounding said antenna and said screening means.

4. A directional system for the reception of electro-magnetic radiations comprising a coil antenna wound in a vertical plane around a ferro-magnetic core, said core made of toroidal sections to form a cylinder, each section being made of compressed finely divided magnetic particles screening means in close relation to said coil antenna and an elongated streamlined housing having semi-conductive outside surface, said housing surrounding said coil antenna and said screening means.

5. A rotatable low impedance directional antenna system for the reception of electro-magnetic radiation comprising a coil antenna wound in a vertical plane around a ferro-magnetic core made in the form of a body of rotation with screening means around said coil antenna and an elongated streamlined dome housing, surrounding said antenna system and said screening means.

6. A rotatable low impedance directional antenna system for the reception of an electro-magnetic radiation comprising a coil antenna wound in a vertical plane around a ferro-magnetic core made in the form of a body of rotation, screening means surrounding said coil antenna and an elongated streamlined dome housing around said system, said housing having a semi-conducting outside surface.

7. A low impedance directional antenna system for the reception of electro-magnetic radiation comprising a coil antenna wound in a vertical plane and around a periphery of a ferro-magnetic core in the form of a body of rotation, said core comprising toroidal sections and made of compressed finely divided magnetic particles and an elongated streamlined housing in the shape of a dome having a semi-conductive outside surface.

WLADIMIR J. POLYDOROFF.

REFERENCES CITED

The following references are of record in the file of this patent:

UNITED STATES PATENTS

| Number | Name | Date |
|---|---|---|
| 2,266,262 | Polydoroff | Dec. 16, 1941 |
| 2,282,030 | Busignies | May 5, 1942 |
| 2,297,466 | Funke et al. | Sept. 29, 1942 |
| 2,316,623 | Roberts | Apr. 13, 1943 |
| 2,343,306 | Lear | Mar. 7, 1944 |
| 2,390,543 | Kreager | Dec. 11, 1945 |